(12) United States Patent
Rogatz

(10) Patent No.: US 7,533,055 B2
(45) Date of Patent: May 12, 2009

(54) METHODS AND SYSTEMS FOR RANKING AND INVESTING IN FINANCIAL INSTRUMENTS

(75) Inventor: Jeffrey F. Rogatz, 118 Hedge Apple La., Greenville, DE (US) 19807

(73) Assignee: Jeffrey F. Rogatz, Wilmington, DE (US)

( * ) Notice: Subject to any disclaimer, the term of this patent is extended or adjusted under 35 U.S.C. 154(b) by 513 days.

(21) Appl. No.: 11/210,408

(22) Filed: Aug. 24, 2005

(65) Prior Publication Data

US 2007/0050274 A1    Mar. 1, 2007

(51) Int. Cl.
*G06Q 40/00* (2006.01)

(52) U.S. Cl. .......................................................... 705/37
(58) Field of Classification Search .................... 705/37
See application file for complete search history.

(56) References Cited

U.S. PATENT DOCUMENTS

| | | | |
|---|---|---|---|
| 6,058,369 A | 5/2000 | Rothstein | |
| 6,564,190 B1 | 5/2003 | Dubner | |
| 6,847,943 B2 | 1/2005 | Dubner | |
| 2002/0059126 A1* | 5/2002 | Ricciardi | 705/36 |
| 2003/0130923 A1* | 7/2003 | Charnley | 705/36 |
| 2005/0004861 A1 | 1/2005 | Bancroft | |
| 2005/0021435 A1 | 1/2005 | Hakanoglu et al. | |
| 2005/0108139 A1* | 5/2005 | Sperandeo | 705/36 |
| 2005/0108148 A1* | 5/2005 | Carlson | 705/37 |
| 2005/0171886 A1* | 8/2005 | Squyres | 705/36 |
| 2006/0015429 A1* | 1/2006 | Sullivan et al. | 705/35 |
| 2006/0031149 A1* | 2/2006 | Lyons et al. | 705/35 |
| 2006/0089892 A1* | 4/2006 | Sullivan et al. | 705/35 |
| 2006/0277124 A1* | 12/2006 | Gerrietts | 705/35 |

FOREIGN PATENT DOCUMENTS

GB    2420425 A  * 11/2004

OTHER PUBLICATIONS

Hall, Robert E., Struggling to Understand the Stock Market, The American Economic Review, vol. 91, No. 2, Papers and Proceedings of the 113th Annual Meeting of the American Economic Association, (May 2001), published by the American Economic Association.*

* cited by examiner

*Primary Examiner*—Charles R Kyle
*Assistant Examiner*—Robert R Niquelle
(74) *Attorney, Agent, or Firm*—Pepper Hamilton LLP

(57) ABSTRACT

Methods and systems for investing in financial instruments are disclosed. For each of a plurality of financial instruments, a net asset value pertaining to a company associated with the financial instrument and an expected return on investment for one or more of an asset acquisition, an asset disposition, an asset development, a capital investment and a debt reduction may be determined. The net asset value for the company may be adjusted based on at least the expected return on investment. A discount percentage for the financial instrument may then be determined based at least in part on the adjusted net asset value. The financial instruments may be ranked based on the discount percentage for each financial instrument.

17 Claims, 3 Drawing Sheets

METHODS AND SYSTEMS FOR RANKING AND INVESTING IN FINANCIAL INSTRUMENTS

BACKGROUND

A plurality of investment strategies are known and used by investors. Pure long strategies invest in stocks, bonds, real estate or other financial instruments that are expected to appreciate in value. One method is to invest in financial instruments that model an index such as the Standard and Poor's 500 Stock Index or the Dow Jones Industrial Average. Another method is to invest in one or more financial instruments that are expected to appreciate in value faster than the indices. A variety of techniques are used to select these financial instruments ranging from analysis of chart patterns of price and volume history for each instrument to fundamental analysis and projections of the underlying business of the company represented by the instrument. These methods are referred to as being long or taking long positions.

Another method of investing seeks to benefit from financial instruments that are expected to decrease in value. In this method, instruments are borrowed and sold in the expectation that the borrowed instrument can be purchased and returned in the future at a lower price. This technique is referred to as selling short or taking a short position. This short selling technique is commonly used by hedge funds. Short selling generates a cash position, and the investor can earn interest on this cash.

When the value of the financial instruments that an investor holds is greater than the amount of capital being invested, the investor's position is "leveraged." The use of leverage is common for long, short or combined investment strategies. The amount of leverage can be expressed as the ratio of the total value of long and short investments to the capital invested, expressed as a percent. Thus, if $100 is invested to purchase $100 worth of financial instruments and to sell short $100 worth of instruments, the leverage is 200%. Such a portfolio is described as being 100% long and 100% short. If an investment manager is successful at choosing better performing longs and/or shorts, the use of leverage can multiply the return for the investor.

Some investment strategies combine both long and short positions. This allows the investment manager to take advantage both of opportunities that are undervalued and opportunities that are overvalued as compared to the overall market.

The particular instruments to be purchased or sold short may be selected by a variety of techniques for predicting expected returns. One family of techniques relates to the analysis of charts of the historical stock movements and their volume. Some investors believe certain patterns on such charts are predictive of future price movements. These techniques are sometimes referred to as technical analysis or charting techniques.

Another family of techniques relates to fundamental analysis of the business issuing the financial instrument. The business is modeled and future earnings and/or dividends (if any) are projected. Using a discount rate, the dividend stream and terminal value of the enterprise are converted to a present value and compared to the market price.

Other techniques reflect the value of stocks compared to peers using factors such as earnings and dividend growth, dividends, price to earnings ratio, and price to book ratio. Still other techniques fall in the category of momentum analysis, selecting the financial instruments that seem to be moving most favorably. Other factors such as insider trading patterns can also be utilized.

The above-listed and other factors are often combined into mathematical or computer models that can be used to predict the best and worst performing financial instruments. Such modeling methods are typically referred to as quantitative methods.

Thus, such computer models typically use past behavior of the financial instrument to predict future behavior. However, such models are limited because they do not analyze the current value of the underlying business, including its tangible assets, and its capability for expansion of its assets as compared to its competitors. Moreover, such models do not analyze the capability for expansion in light of the current price of the financial instrument.

What is needed is a method of ranking financial instruments for companies based on each company's net asset value as modified by the company's capacity to expand its operations.

A need exists for a method of determining whether a financial instrument is selling at a premium or a discount to the market based on the modified net asset value for the company to which the instrument pertains.

A further need exists for a method for determining an investor's market exposure based on the ranked financial instruments and the current value of the market as a whole as compared to a historical average.

The present disclosure is directed to solving one or more of the above-listed problems.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "financial instrument" is a reference to one or more financial instruments and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

In an embodiment, a method of investing in financial instruments may include, for each of a plurality of financial instruments, determining a net asset value pertaining to a company associated with the financial instrument, determining an expected return on investment for one or more of an asset acquisition, an asset disposition, an asset development, a capital investment, a capital liability, an assumption of debt and a debt reduction, adjusting the net asset value for the company based on at least the expected return on investment, and determining a discount percentage for the financial instrument based at least in part on the adjusted net asset value; and ranking the plurality of financial instruments based on the discount percentage for each financial instrument. In an embodiment, the method may further include determining a historical ratio equal to a mean of a first plurality of financial instrument ratios, determining a current ratio equal to a mean of a second plurality of financial instrument ratios, and investing in one or more of the financial instruments based on the current ratio and the historical ratio. The first plurality of financial instrument ratios may include financial instrument ratios computed for each financial instrument at each of a plurality of time intervals. Each financial instrument ratio may be equal to the price for a financial instrument at a particular time interval divided by the net asset value for the financial instrument at the particular time interval. The second plurality of financial instrument ratios may include current financial instrument ratios computed for each financial instrument.

In an embodiment, a method of investing in financial instruments may include, for each of a plurality of financial instruments, determining a net asset value for the company associated with the financial instrument, and determining a discount percentage for the financial instrument based at least in part on the net asset value; and ranking the plurality of financial instruments based on the discount percentage. In an embodiment, the method may further include determining a historical ratio equal to a mean of a first plurality of financial instrument ratios, determining a current ratio equal to a mean of a second plurality of financial instrument ratios, and investing in one or more of the financial instruments based on the current ratio and the historical ratio. The first plurality of financial instrument ratios may include financial instrument ratios computed for each financial instrument at each of a plurality of time intervals. Each financial instrument ratio may be equal to the price for a financial instrument at a particular time interval divided by the net asset value for the financial instrument at the particular time interval. The second plurality of financial instrument ratios may include current financial instrument ratios computed for each financial instrument.

In an embodiment, a system for investing in financial instruments may include a processor, and a processor-readable storage medium in communication with the processor. The processor-readable storage medium may contain one or more programming instructions for performing a method for investing in financial instruments. In an embodiment, the method may include, for each of a plurality of financial instruments, determining a net asset value for the company associated with the financial instrument, and determining a discount percentage for the financial instrument based at least in part on the net asset value; ranking the plurality of financial instruments based on the discount percentage; and investing in one or more financial instruments based at least in part on the discount percentage for each financial instrument.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION

The embodiments described below are described in reference to real estate investment vehicles, such as real estate investment trusts and the like. It will be apparent to one of skill in the art that such methods may be similarly applied to other investment vehicles using the principles described herein. This disclosure is intended to encompass such equivalent investment vehicles, methods, alternatives, modifications, variations and improvements.

Figure 1:
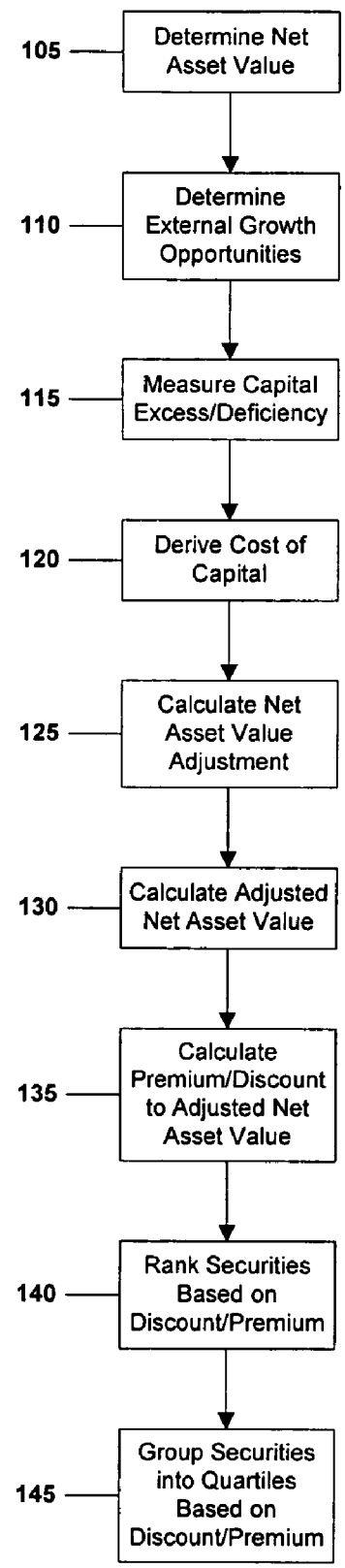
FIG. 1 depicts a flow diagram for an exemplary method of ranking financial instruments according to an embodiment.

FIG. 1 depicts a flow diagram for an exemplary method of ranking financial instruments according to an embodiment. Initially, a plurality of financial instruments may be identified. In an embodiment, each financial instrument may be a publicly traded investment vehicle for which a price is assigned, such as continuously during trading hours or on a daily basis. In an embodiment, the plurality of financial instruments may each correspond to a similar market, such as real estate, or a class of related instruments, such as Dow 30 stocks.

For each financial instrument, a net asset value (NAV) may be determined 105. The NAV may be equal to the net assets minus the net liabilities for a company. In an embodiment, the net assets may equal a sum of factors including, without limitation, a company's cash flow, the product of the company's net operating income (NOI) and a multiple, and other assets. The multiple may be the inverse of the capitalization rate for the company or for a market or class of which the company is a member as a whole. In an embodiment, the net liabilities may equal a sum of factors including, without limitation, sources of debt for a company and a debt mark-to-market value. The debt mark-to-market value may be computed based on, for example, the amount of outstanding debt, the average number of years remaining to repay such debt, the average interest rate at which such debt is financed and the current market interest rate. Normalization of a company's NAV may be performed by dividing the NAV by the number of outstanding shares for the corresponding financial instrument.

In an embodiment, the NAV for each financial instrument may be readily determined based on publicly available information. Financial instrument selection may be based, at least in part, upon the availability of the information required to compute the NAV. In an embodiment, preliminary information pertaining to the NAV may be received from a third party supplier.

External growth opportunities may then be determined 110 for each company. An external growth opportunity may represent return on investment due to an acquisition, a disposition, or a development of an asset, such as a real estate property. The expected return on investment due to external growth opportunities may depend upon an expected yield for each acquisition, disposition or development of an asset. For a real estate financial instrument, the expected yield may depend upon the location at which a particular property that is being acquired, disposed of or developed resides. The expected return on investment may further depend upon a capital investment or liability, or an assumption or reduction of outstanding debt. If the return on investment occurs at a higher rate than the cost of capital, the increase may be added to the NAV. In an embodiment, external growth opportunities may be determined based upon research and/or conversations with those having knowledge of a particular market.

The capital excess or deficiency for a company may then be determined 115. The capital excess/deficiency may be determined based on the average capitalization structure for the market, the company's capitalization structure, and/or the maximum leverage available to a company. For example, if a company can leverage up to 60% of its assets, has only leveraged 30% of its assets, and external growth opportunities provide a higher rate of return than the cost of additional debt, the company may obtain additional leverage to maximize its return on investment. Conversely, if a company is overleveraged and/or the return on investment for external growth opportunities is less than the cost of additional equity, the company may reduce its leverage by paying off outstanding debt.

The ideal amount of capital excess/deficiency may be determined using, for example, the adjusted funds from operations ("AFFO") for the company, the dividend payment (if any) and the amount of additional leverage the company may incur. AFFO may refer to a measure of a company's cash that is available for distribution to shareholders or other uses. AFFO may be calculated by subtracting, from funds from operations ("FFO"), (1) normalized recurring capital expenditures; (2) "straight-lining" of rents; and (3) nonrecurring expenses. For example, if a company has $200M in AFFO, pays $175M in dividend payments, and can incur 20% more debt (on an operation of $7.5B), the amount of capital deficiency for the company may equal ($200M−$175M)+ (0.2*7.5B), or $1.525B. In other words, the company could incur an additional $1.525B in debt. Other methods for determining the capital excess or deficiency may also be performed within the scope of this disclosure.

The cost of capital may then be determined 120 based on the capital excess/deficiency. In an embodiment, if a capital deficiency exists, then a comparison between the external growth opportunities and the capital deficiency may be performed to determine whether it would be profitable to increase the company's outstanding debt to perform the external growth opportunities. This comparison may be based on, for example, the cost of debt, the cost of capital and the expected yield from the external growth opportunities.

In an embodiment, if a capital excess exists, then a comparison between the external growth opportunities and the capital excess may be performed to determine how much of the capital excess may be applied toward developing external growth opportunities or reducing debt. This comparison may be based on, for example, the cost of debt, the cost of capital and the expected yield from the external growth opportunities.

In an embodiment, if neither a capital excess nor a capital deficiency exists, then the value of the company may grow by the product of the value of the external growth opportunities and the difference between the expected yield and the weighted average cost of capital.

A NAV adjustment may then be calculated 125 based on the cost of capital determination. In an embodiment, the cost of capital may be multiplied by a multiple to determine the potential NAV growth for a company (the NAV adjustment). This NAV growth value may be added to the original NAV to produce 130 an adjusted (forward-looking) NAV.

The price of the financial instrument may be compared with the adjusted NAV to determine whether the instrument is trading at a premium or a discount. For example, the price of the financial instrument may be divided by the adjusted NAV to calculate 135 the premium or discount percentage.

The financial instruments considered above may then be ranked 140 based on the discount/premium for each financial instrument. In an embodiment, the financial instruments may be ranked from the instrument having the largest discount (or smallest premium) to the instrument having the largest premium (or smallest discount). The financial instruments may be grouped 145 into quartiles based on this ranking such that quartile 1 may refer to the approximately 25% of the instruments having the largest discount (or smallest premium) and quartile 4 may refer to the approximately 25% of the instruments having the largest premium (or smallest discount). In an embodiment, financial instruments in quartile 1 may be purchased as long positions depending upon market conditions. In an embodiment, financial instruments in quartile 4 may be purchased as short positions depending upon market conditions.

Figure 2:
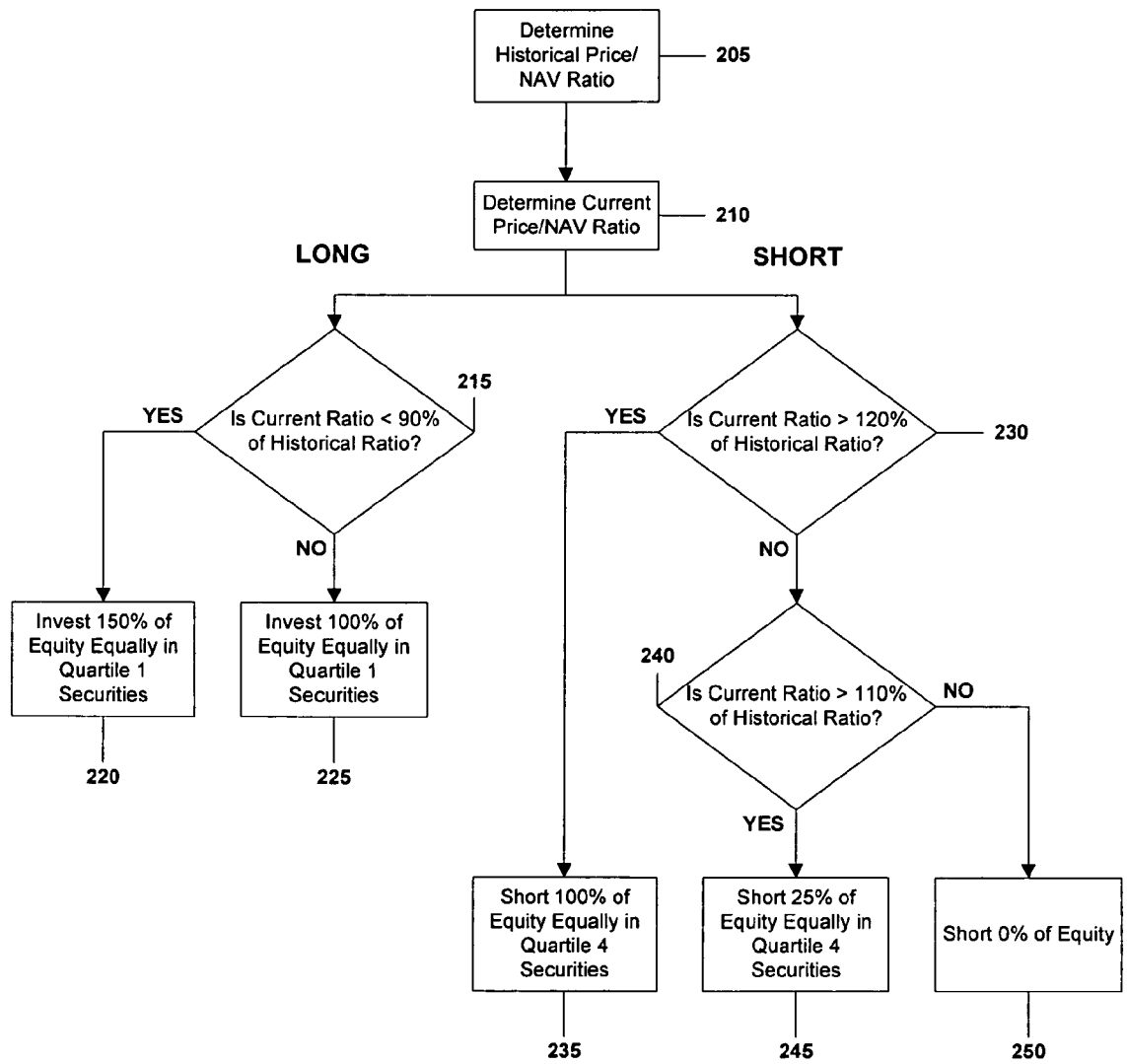
FIG. 2 depicts a flow diagram for an exemplary method of determining market exposure based on a set of ranked financial instruments and a determination of a relative value of a market according to an embodiment.

FIG. 2 depicts a flow diagram for an exemplary method of determining market exposure based on a set of ranked financial instruments and a determination of a relative value of a market according to an embodiment. Initially, a historical ratio between price and NAV may be determined 205. In an embodiment, the historical ratio may be computed based on the price and the net asset value for each of a plurality of financial instruments at a plurality of intervals. For example, the price and net asset value may be determined on a daily, weekly, monthly or yearly basis over a period of time. Alternately, the price and net asset value may be determined on irregular intervals. A financial instrument ratio equal to the price for a financial instrument divided by the net asset value for the financial instrument may then be determined for each financial instrument at each interval. The historical ratio may then be set to the mean of the financial instrument ratios for each interval and each financial instrument. In an embodiment, the historical ratio may be computed based on the particular financial instruments for which the ranking process is performed. In an alternate embodiment, the historical ratio may be computed based on financial instruments in the industry for which the ranking process is performed. The historical ratio may be used as a baseline for determining market exposure.

A current ratio between the price of the financial instrument and the NAV for each instrument in the ranked list may also be computed 210. In an embodiment, the current ratio may be computed based on the price and the net asset value for each of a plurality of financial instruments at the present time. A financial instrument ratio equal to the price for a financial instrument divided by the net asset value for the financial instrument may then be determined for each financial instrument. The current ratio may then be set to the mean of the financial instrument ratios for each financial instrument. In an embodiment, the current ratio may be computed based on the particular financial instruments for which the ranking process is performed. In an alternate embodiment, the current ratio may be computed based on financial instruments in the industry for which the ranking process is performed.

Determining 215 the amount of equity to invest in financial instruments in quartile 1 in a long position may be based on the ratio between the current ratio and the historical ratio. In an embodiment, if the current ratio is less than a first percentage, such as 90%, of the historical ratio, then an investor or investment fund may invest 220, for example, 150% of equity into quartile 1 financial instruments. In an embodiment, an equivalent long position may be made in each quartile 1 financial instrument. 150% of equity may represent a condition where the investor or investment fund borrows money in order to invest in the quartile 1 financial instruments.

If the current ratio is not less than the first percentage of the historical ratio, then the investor or investment fund may invest 225, for example, 100% of equity into quartile 1 financial instruments. In an embodiment, an equivalent long position may be made in each quartile 1 financial instrument.

Determining 230 the amount of equity used to short instruments in quartile 4 may similarly be based on the ratio between the current ratio and the historical ratio. In an embodiment, if the current ratio is greater than a second percentage, such as 120%, of the historical ratio, then an investor or investment fund may short 235 quartile 4 financial instruments in a position equal to, for example, 100% of equity. In an embodiment, an equivalent short position may be taken in each quartile 4 financial instrument.

If the current ratio is not greater than the second percentage of the historical ratio, then if the current ratio is greater than a third percentage, such as 110%, of the historical ratio 240, then an investor or investment fund may short 245 quartile 4 financial instruments in a position equal to, for example, 25% of equity. In an embodiment, an equivalent short position may be made in each quartile 4 financial instrument.

If the current ratio is not greater than the third percentage of the historical ratio, then the investor or investment fund may not short 250 quartile 4 financial instruments.

The net market exposure based on the above-described embodiment is represented in Table 1 below.

TABLE 1

Net Market Exposure

| Current Ratio / Historical Ratio | Long Position | Short Position | Net Market Exposure |
|---|---|---|---|
| x < 90% | 150% | 0% | 150% |
| 90% < x < 110% | 100% | 0% | 100% |
| 110% < x < 120% | 100% | 25% | 75% |
| x > 120% | 100% | 100% | 0% |

Alternate or additional breakpoints, long positions, and/or short positions may be used based on the description above.

Figure 3:
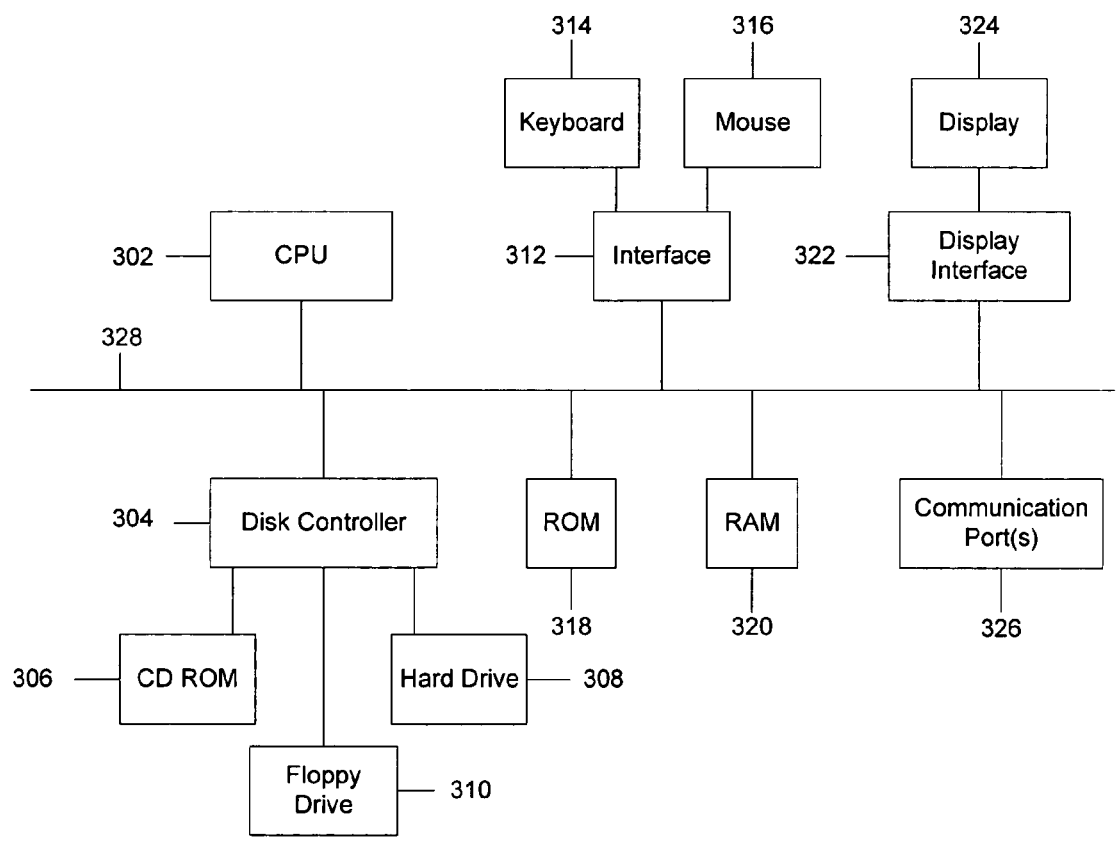
FIG. 3 is a block diagram of exemplary internal hardware that may be used to contain or implement program instructions according to an embodiment.

FIG. 3 is a block diagram of exemplary internal hardware that may be used to contain or implement program instructions according to an embodiment. Referring to FIG. 3, a bus 328 may serve as a main information highway interconnecting the other illustrated components of the hardware. CPU 302 is the central processing unit of the system, performing calculations and logic operations required to execute a program. Read only memory (ROM) 318 and random access memory (RAM) 320 constitute exemplary memory devices.

A disk controller 304 interfaces with one or more optional disk drives to the system bus 328. These disk drives may be external or internal floppy disk drives such as 310, CD ROM drives 306, or external or internal hard drives 308. As indicated previously, these various disk drives and disk controllers are optional devices.

Program instructions may be stored in the ROM 318 and/or the RAM 320. Optionally, program instructions may be stored on a computer readable medium such as a floppy disk or a digital disk or other recording medium, a communications signal or a carrier wave.

An optional display interface 322 may permit information from the bus 328 to be displayed on the display 324 in audio, graphic or alphanumeric format. Communication with external devices may optionally occur using various communication ports 326. An exemplary communication port 326 may be attached to a communications network, such as the Internet or an intranet.

In addition to computer-type components and their equivalents, the hardware may also include an interface 312 which allows for receipt of data from input devices such as a keyboard 314 or other input device 316 such as a remote control, pointer and/or joystick.

A multiprocessor system may optionally be used to perform one, some or all of the operations described herein. Likewise, an embedded system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of investing in financial instruments, the method comprising:

for each of a plurality of financial instruments:
determining, by a processing unit, a net asset value pertaining to a company associated with the financial instrument,
determining, by the processing unit, an expected return on investment for one or more of an asset acquisition, an asset disposition, an asset development, a capital investment, a capital liability, an assumption of debt and a debt reduction by:
determining a first amount of leverage available to the company,
determining a second amount of leverage used by the company,
determining an expected yield for an investment,
if the first amount of leverage is greater than the second amount of leverage and the expected yield is greater than a cost of debt, determining a cost of debt and setting the expected return on investment for the investment to the difference between the expected yield and the cost of debt,
if the second amount of leverage is greater than the first amount of leverage and the expected yield is less than a cost of capital, determining a cost of capital and setting the expected return on investment for the investment to the difference between the cost of capital and the expected yield, and
if the first amount of leverage equals the second amount of leverage, determining a weighted average cost of capital and setting the expected return on investment for the investment to the difference between the expected yield and the weighted average cost of capital,
adjusting the net asset value for the company based on at least the expected return on investment, and
determining a discount percentage for the financial instrument based at least in part on the adjusted net asset value;
ranking the plurality of financial instruments based on the discount percentage for each financial instrument; and
displaying the ranked financial instruments.

2. The method of claim 1 wherein determining the discount percentage comprises dividing the current price of the financial instrument by the adjusted net asset value for the financial instrument.

3. The method of claim 1, further comprising:
determining a historical ratio equal to a mean of a first plurality of financial instrument ratios, wherein the first plurality of financial instrument ratios comprises financial instrument ratios computed for each financial instrument at each of a plurality of time intervals, wherein each financial instrument ratio is equal to the price for a financial instrument at a particular time interval divided by the net asset value for the financial instrument at the particular time interval;

determining a current ratio equal to a mean of a second plurality of financial instrument ratios, wherein the second plurality of financial instrument ratios comprises current financial instrument ratios computed for each financial instrument; and investing in one or more of the financial instruments based on the current ratio and the historical ratio.

4. The method of claim 3 wherein investing in one or more of the financial instruments comprises:

selecting a first quartile of the plurality of financial instruments, wherein the financial instruments in the first quartile comprise approximately 25% of the financial instruments having the largest discount percentage;

selecting a second quartile of the plurality of financial instruments, wherein the financial instruments in the second quartile comprise approximately 25% of the financial instruments having the smallest discount percentage;

determining a long position; and determining a short position.

5. The method of claim 4 wherein determining a long position comprises:

if the current ratio divided by the historical ratio is less than a first percentage, investing a first equity percentage of equity in the financial instruments in the first quartile; and if not, investing a second equity percentage of equity in the financial instruments in the first quartile.

6. The method of claim 5 wherein the first percentage is approximately 90%, the first equity percentage is approximately 150%, and the second equity percentage is approximately 100%.

7. The method of claim 4 wherein determining a short position comprises:

if the current ratio divided by the historical ratio is greater than a first percentage, taking a short position equal to a first equity percentage of equity in financial instruments in the second quartile;

if the current ratio divided by the historical ratio is less than the first percentage but greater than a second percentage, taking a short position equal to a second equity percentage of equity in financial instruments in the second quartile; and if the current ratio divided by the historical ratio is less than the second percentage, taking a short position equal to a third equity percentage of equity in financial instruments in the second quartile.

8. The method of claim 7 wherein the first percentage is approximately 120%, the second percentage is approximately 110%, the first equity percentage is approximately 100%, the second equity percentage is approximately 25%, and the third equity percentage is approximately 0%.

9. A method of investing in financial instruments, the method comprising:

for each of a plurality of financial instruments:

determining, by a processing unit, a net asset value for the company associated with the financial instrument, determining, by the processing unit, an expected return on investment for one or more of an asset acquisition, an asset disposition, an asset development, a capital investment, a capital liability, an assumption of debt and a debt reduction by:

determining a first amount of leverage available to the company, determining a second amount of leverage used by the company, determining an expected yield for an investment, if the first amount of leverage is greater than the second amount of leverage and the expected yield is greater than a cost of debt, determining a cost of debt and selling the expected return on investment for the investment to the difference between the expected yield and the cost of debt, if the second amount of leverage is greater than the first amount of leverage and the expected yield is less than a cost of capital, determining a cost of capital and selling the expected return on investment for the investment to the difference between the cost of capital and the expected yield, and if the first amount of leverage equals the second amount of leverage, determining a weighted average cost of capital and setting the expected return on investment for the investment to the difference between the expected yield and the weighted average cost of capital, adjusting the net asset value for the company based on at least the expected return on investment, and determining a discount percentage for the financial instrument based at least in part on the adjusted net asset value; and displaying the financial instruments.

10. The method of claim 9 wherein determining the discount percentage comprises dividing the current price of the financial instrument by the adjusted net asset value for the financial instrument.

11. The method of claim 9 further comprising:

determining a historical ratio equal to a mean of a first plurality of financial instrument ratios, wherein the first plurality of financial instrument ratios comprises financial instrument ratios computed for each financial instrument at each of a plurality of time intervals, wherein each financial instrument ratio is equal to the price for a financial instrument at a particular time interval divided by the net asset value for the financial instrument at the particular time interval;

determining a current ratio equal to a mean of a second plurality of financial instrument ratios, wherein the second plurality of financial instrument ratios comprises current financial instrument ratios computed for each financial instrument; and investing in one or more of the financial instruments based on the current ratio and the historical ratio.

12. The method of claim 11 wherein investing in one or more of the financial instruments comprises:

selecting a first quartile of the plurality of financial instruments, wherein the financial instruments in the first quartile comprise approximately 25% of the financial instruments having the largest discount percentage;

selecting a second quartile of the plurality of financial instruments, wherein the financial instruments in the second quartile comprise approximately 25% of the financial instruments having the smallest discount percentage;

determining a long position; and determining a short position.

13. The method of claim 12 wherein determining a long position comprises:

if the current ratio divided by the historical ratio is less than a first percentage, investing a first equity percentage of equity in the financial instruments in the first quartile; and if not, investing a second equity percentage of equity in the financial instruments in the first quartile.

14. The method of claim 13 wherein the first percentage is approximately 90%, the first equity percentage is approximately 150%, and the second equity percentage is approximately 100%.

15. The method of claim 12 wherein determining a short position comprises:
- if the current ratio divided by the historical ratio is greater than a first percentage, taking a short position equal to a first equity percentage of equity in financial instruments in the second quartile;
- if the current ratio divided by the historical ratio is less than the first percentage but greater than a second percentage, taking a short position equal to a second equity percentage of equity in financial instruments in the second quartile; and
- if the current ratio divided by the historical ratio is less than the second percentage, taking a short position equal to a third equity percentage of equity in financial instruments in the second quartile.

16. The method of claim 15 wherein the first percentage is approximately 120%, the second percentage is approximately 110%, the first equity percentage is approximately 100%, the second equity percentage is approximately 25%, and the third equity percentage is approximately 0%.

17. A system for investing in financial instruments, the system comprising:
- a processor; and
- a processor-readable storage medium in communication with the processor;
- wherein the processor-readable storage medium contains one or more programming instructions for performing the following:
  - for each of a plurality of financial instruments:
    - determining a net asset value for the company associated with the financial instrument,
    - determining an expected return on investment for one or more of an asset acquisition, an asset disposition, an asset development, a capital investment, a capital liability, an assumption of debt and a debt reduction, by:
      - determining a first amount of leverage available to the company,
      - determining a second amount of leverage used by the company,
      - determining an expected yield for an investment,
      - if the first amount of leverage is greater than the second amount of leverage and the expected yield is greater than a cost of debt, determining a cost of debt and setting the expected return on investment for the investment to the difference between the expected yield and the cost of debt,
      - if the second amount of leverage is greater than the first amount of leverage and the expected yield is less than a cost of capital, determining a cost of capital and setting the expected return on investment for the investment to the difference between the cost of capital and the expected yield, and
      - if the first amount of Leverage equals the second amount of leverage, determining a weighted average cost of capital and setting the expected return on investment for the investment to the difference between the expected yield and the weighted average cost of capital,
    - adjusting the net asset value for the company based on at Least the expected return on investment, and
    - determining a discount percentage for the financial instrument based at least in part on the adjusted net asset value,
  - ranking the plurality of financial instruments based on the discount percentage, and
  - investing in one or more financial instruments based at least in part on the discount percentage for each financial instrument.

* * * * *